United States Patent
McKeen et al.

(10) Patent No.: US 6,529,880 B1
(45) Date of Patent: Mar. 4, 2003

(54) AUTOMATIC PAYMENT SYSTEM FOR A PLURALITY OF REMOTE MERCHANTS

(75) Inventors: Kyle Clifford McKeen, Richardson, TX (US); Robert B. Anthonyson, Sunapee, NH (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/452,547

(22) Filed: Dec. 1, 1999

(51) Int. Cl.⁷ .............................................. G06F 17/60
(52) U.S. Cl. .......................................... 705/17; 705/44
(58) Field of Search ..................... 705/17, 44

(56) References Cited

U.S. PATENT DOCUMENTS

| | | | | |
|---|---|---|---|---|
| 4,727,243 A | * | 2/1988 | Savar ........................... | 705/17 |
| 4,891,503 A | * | 1/1990 | Jewell ......................... | 235/380 |
| 5,177,342 A | * | 1/1993 | Adams ........................ | 235/379 |
| 5,414,624 A | | 5/1995 | Anthonyson | |
| 5,535,407 A | * | 7/1996 | Yanagawa et al. .......... | 235/380 |
| 5,737,710 A | | 4/1998 | Anthonyson | |
| 5,878,141 A | * | 3/1999 | Daly et al. .................... | 705/17 |
| 6,014,636 A | * | 1/2000 | Reeder ......................... | 705/17 |
| 6,023,684 A | * | 2/2000 | Pearson ........................ | 705/35 |
| 6,089,284 A | * | 7/2000 | Kaehler et al. ............. | 705/413 |
| 6,121,880 A | * | 9/2000 | Scott et al. .................... | 705/17 |
| 6,226,624 B1 | * | 5/2001 | Watson et al. ................ | 705/44 |

FOREIGN PATENT DOCUMENTS

| | | | | |
|---|---|---|---|---|
| EP | 0 834 838 A2 | * | 8/1998 | ........... G07B/15/00 |
| SE | WO 99/48052 | | 9/1999 | |

OTHER PUBLICATIONS

"Sensormatic to Provide Access Control Systems for Campus Security at Florida State University", Feb. 7, 1996, Business Wire.*

"Optivision Selected by Lockheed Martin for Orange County Automated Toll Roads Surveillance Project." Jan. 18, 1999, PR Newswire, p 5546.*

"Can Fueling Up Be Fun?", By John Callanan; The Journal of Petroleum Marketing; pp. 1 4; Aug. 31, 1999.

"Mobile Uses IT To Speed Past Competition", Cutting Edge: Business Advantage (Datamation); pp. 1–4; Oct. 1997.

* cited by examiner

Primary Examiner—Robert P. Olszewski
Assistant Examiner—Bryan Jaketic
(74) Attorney, Agent, or Firm—O'Melveny & Myers llp

(57) ABSTRACT

An automated payment system for a plurality of remote merchants includes a clearinghouse server, a plurality of customer tags and a plurality of local merchant systems. The clearinghouse system includes a customer database and merchant database. A customer joining the clearinghouse service is provided with a customer tag, such as an RFID transponder, which stores a tag identification number. Each remote merchant includes a local merchant system which includes a reader, point-of-sale system, a customer database and a transaction database. The reader is adapted to automatically retrieve the tag identification number from a customer tag when the customer tag is within an associated reading area, such as a stopping location of drive-through lane or a short-term parking stall. The customer's order is entered and processed on the point-of-sale system which is adapted to handle both standard cash transactions and authorized cashless transactions. The authorization database includes tag identification numbers for each tag of a customer authorized to use the automated payment system. A search is conducted in the authorization database for the tag identification number retrieved by the reader, and if found, the point-of-sale system is authorized to process a cashless transaction for the associated customer. The transaction database stores information for each authorized cashless transaction completed by the point-of-sale system, and periodically transmits the stored transaction information to the clearinghouse system which withdraws funds from the associated customer account and remits payment to the associated merchant account.

15 Claims, 4 Drawing Sheets

AUTOMATIC PAYMENT SYSTEM FOR A PLURALITY OF REMOTE MERCHANTS

BACKGROUND OF THE INVENTION

1. Field of the Invention

The present invention relates to automatic payment systems, and more particularly, to a vehicle identification and payment system for use with a plurality of merchants.

2. Description of Related Art

One way that merchants attract consumers to their businesses is by offering convenient and superior service. One example is the drive-through lane of a fast food restaurant which allows a customer to place an order, pay for the order and receive the ordered food without leaving his or her vehicle. Other businesses such as gas stations and dry cleaners offer similar types of conveniences that are also based on the knowledge that many of their customers will likely be arriving in a vehicle. For example, a dry cleaner may have a drive-through service or convenient short-term parking stalls near the entrance of the establishment providing the customer with easy access to the business.

Another convenience generally offered to consumers is the ability to use credit cards or bank debit cards for the payment of goods and services. Such cashless systems allow the consumer to remit payment without having to manually withdraw and carry cash from a bank. One drawback with credit cards is the lengthy processing time required to complete a credit card transaction. Although current processing times of cashless systems are considered acceptable in many environments, especially when large transactions are involved, most cashless systems are inefficient for applications such as fast food drive-through lanes where the size of the transaction is small, the customer arrives in a vehicle, and/or the customer expects fast service.

Cashless systems have been developed that overcome some of the deficiencies of a standard credit card transaction. For example, in certain automated parking garages a customer is provided with a radio frequency identification (RFID) tag which identifies the customer to the proprietor of the parking garage. The RFID tag may take many forms, for example it may be attached to the vehicle, provided in a card, or in a key fob. When the customer enters the parking facility, the RFID tag is interrogated by a card reader which is located at the entrance of the parking garage close to an entrance gate. The card reader is connected to a host computer which checks stored user information associated with the ID number, authorizes the car to enter, and tracks the time that the car is parked in the garage. A local host computer maintains account information for the identified vehicle, which can be used to prepare periodic billing statements that are mailed to the customer. A proprietor may have more than one parking garage, with each local host computer connected to a single remote computer for the centralized production of billing statements.

Another example of this type of system is MOBIL SPEEDPASS™ which is used for the purchase of gasoline. The company issues RFID tags to its customers that identify the customer by an ID number. When a customer pulls up to a gas pump, the RFID tag is interrogated to receive the ID number of the tag. That number is sent via satellite to a host computer which authenticates the tag. If authorized, the host computer returns an authorization signal to enable the gasoline pump. The host computer charges a previously selected credit or bank debit card to pay for the gasoline that was actually pumped. After the credit or bank debit card transaction is complete, a receipt is printed for the customer. The final transaction is then recorded in a central database which is used to track customer buying patterns.

The prior art cashless systems described above have many drawbacks. For example, each merchant issues its own proprietary identification card forcing a consumer to carry a separate form of payment for each merchant. Further, the processing times of credit card payments of these systems is too slow and inconvenient for applications such as fast food drive through restaurants. Thus, it would be desirable to implement a fast, convenient way for customers to pay for goods and services without using cash. It would also be desirable to provide a cashless system that can operate with multiple retail locations and payment centers that allows for fast and convenient processing of cashless transactions. It would further be desirable to reduce the average processing time of such cashless transactions to less than the average processing time of a standard cash transaction.

SUMMARY OF THE INVENTION

The present invention provides a system and method for implementing cashless transactions through multiple payment centers and multiple merchants that overcomes many of the deficiencies in the prior art systems.

In one embodiment of the present invention, an automated payment system for a plurality of remote merchants includes a clearinghouse system, a plurality of customer tags and a plurality of local merchant systems. The clearinghouse system includes a customer database for storing information associated with each customer of the automated payment system. The customer information includes a unique customer identification number for each customer and customer account information. When a customer joins the clearinghouse service, the unique customer identification number is assigned and the customer arranges a payment method with the clearinghouse service. For example; the customer may provide the clearinghouse service with a pre-paid cash balance, may authorize the clearinghouse service to automatically deduct cashless transactions from a credit card account or bank account, or may be billed directly. The customer is then provided with one or more customer tags, such as an RFID transponder, each tag having a unique tag identification number. In a preferred embodiment, the RFID transponder is provided on an adhesive substrate which is attached directly to a window of a customer's vehicle.

The clearinghouse system also includes a merchant database, which stores information associated with each remote merchant that offers the cashless payment services of the clearinghouse system. The merchant information includes a unique merchant identification number and merchant account information. For example, the merchant may provide bank account information so that cashless transactions may be paid directly to the merchant's bank account.

Each remote merchant includes a local merchant system which includes a reader, a point-of-sale system, an authorization database and a transaction database. The reader is adapted to automatically retrieve the tag identification number from a customer tag when the customer tag is within an associated reading area. In a preferred embodiment, the reader is an RFID interrogator and its associated reading area is located in a merchant drive-through lane at a location where customers are expected to stop their vehicles, such as at a menu board of a fast food restaurant where customers place their food orders. In an alternate embodiment, the reading area may be a short-term parking stall.

The point-of-sale system is used for entering and processing customer orders, and is adapted to handle both standard cash transactions and the authorized cashless transactions of the present invention. The authorization database includes tag identification numbers for each customer authorized to use the automated payment system. Periodic updates to the authorization database may be downloaded from the customer database of the clearinghouse system. After the reader retrieves a tag identification number from a customer tag, a search is conducted in the authorization database for the retrieved tag identification number. If the retrieved number is found, the point-of-sale system is authorized to process a cashless transaction for the customer associated with the tag identification number. In an alternate embodiment, when the retrieved number is not found in the authorization database, the reader disables the customer tag (e.g., by overwriting the tag identification number).

The transaction database stores information for each authorized cashless transaction completed by the point-of-sale system. The transaction database periodically transmits the stored transaction information to the clearinghouse system, preferably over the Internet. For each cashless transaction transmitted to the clearinghouse system, the clearinghouse system withdraws funds from the associated customer account and remits payment to the associated merchant account.

In another embodiment of the present invention, a method for processing a cashless transaction at a remote merchant is provided. A tag reader is operated to automatically retrieve a tag identification number associated with a customer's vehicle. Next, a cashless transaction is authorized if the retrieved tag identification number is found in the list of valid tag identification numbers stored in the computer database of the local merchant computer system. In an alternate embodiment, if the retrieved tag identification number is not found in the list of valid customer identification numbers, then the tag reader is operated to disable the customer identification number associated with the customer's vehicle. The cashless transaction is entered into the local point-of-sale system, and subsequently, data describing the cashless transaction, including the retrieved customer identification number, is stored in the computer database of the merchant computer system.

The stored cashless transactions are periodically uploaded to the clearinghouse computer, which withdraws each transaction amount from the customer's account associated with the retrieved customer identification number and remits each transaction amount to the remote merchant's account. In an alternate embodiment, the method further includes the step of periodically updating the list of valid customer identification numbers by downloading updates from the clearinghouse computer.

A more complete understanding of the automated payment system for a plurality of remote merchants will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

Figure 1:
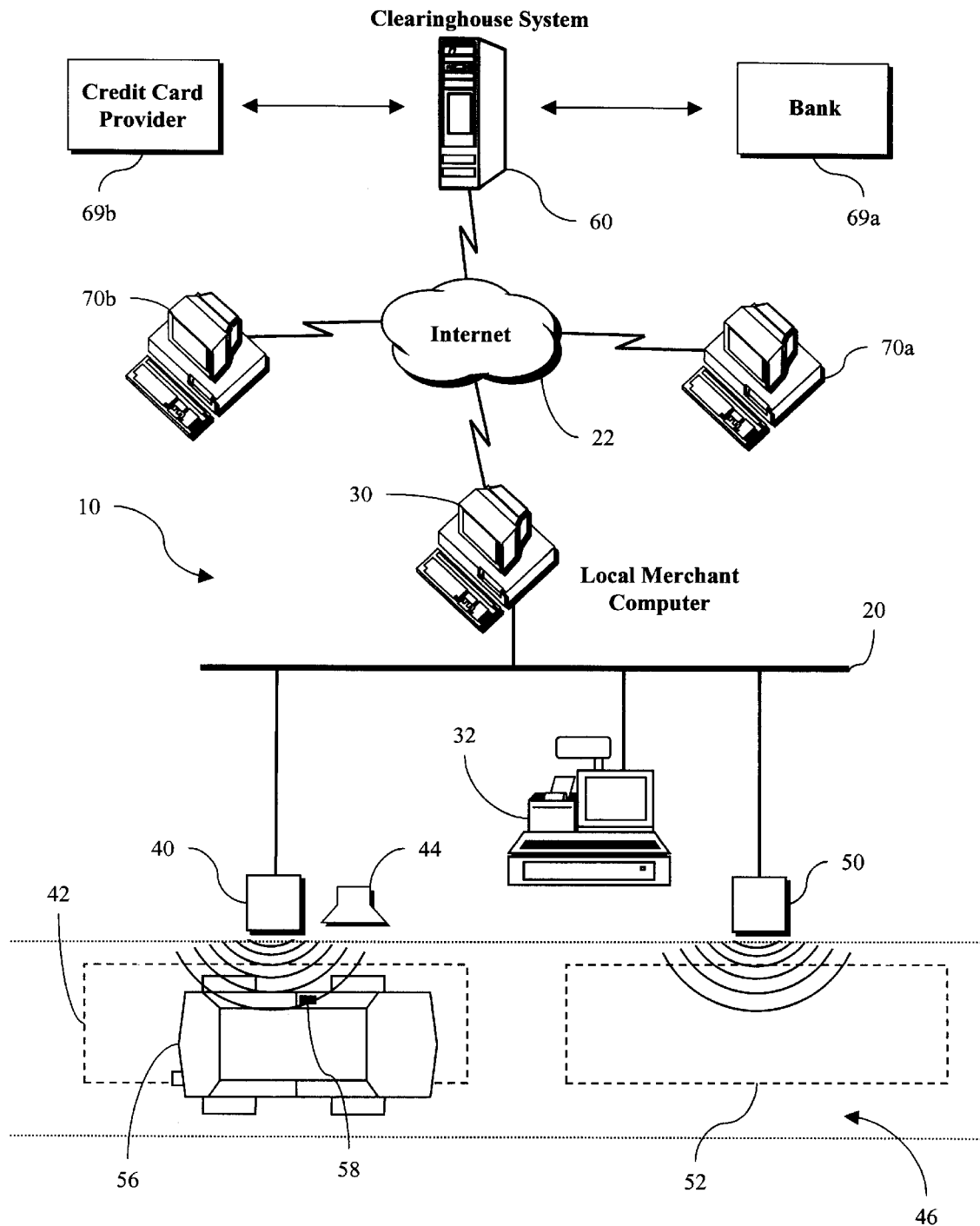
FIG. 1 illustrates a preferred embodiment of an automated payment system for a plurality of remote merchants.

The present invention provides an automatic payment system for use with a plurality of remote merchants whose customers may be expected to arrive in vehicles. Detailed reference will now be made to preferred embodiments of the present invention. In the detailed description that follows, like reference numerals are used to describe like elements in one or more of the figures.

In FIG. 1, an automatic payment system 10 for use with a plurality of remote merchants is illustrated. The automatic payment system 10 includes a local area network (LAN) 20, which connects a local merchant computer 30 to a point-of-sale system 32 and a reader 40. Although a LAN is illustrated, any other communications link as known in the art may be used to provide communications between the local computer 30, the point-of-sale system 32 and the reader 40, including a wireless network, an intranet or a direct connection between the devices. The local computer 30 is a general purpose computer including a database and communications capabilities. In the preferred embodiment, the communications capabilities allow the local computer 30 to communicate with a remote computer, such as a clearinghouse system. 60, preferably through a network 22, such as the Internet. However, other communications methods may also be used such as satellite transmission, or a direct dial connection over standard telephone lines. The point-of-sale system 32 is a programmable point-of-sale system adapted for entering and processing customer orders, and in a preferred embodiment includes a cash drawer, a receipt printer, a display screen, and inventory management software. It is anticipated that the local computer 30, the point-of-sale system 32, and the reader 40 may be integrated as a single computer system, or distributed among any number of devices.

In the illustrated embodiment, the automatic payment system 10 is used in connection with a drive-through lane 46. The reader 40 is positioned adjacent to the drive-through lane 46 and is capable of reading information from identification tags, such as ID tag 58 attached to vehicle 56, within reading area 42. For example, a drive-through lane of a fast food restaurant may include a first location displaying a menu and having a two-way speaker 44 through which a customer may communicate with a salesperson to place a food order, and a second location having a window through which the customer may receive the ordered food and at which a salesperson may register the order on the point-of-sale system 32. As illustrated, the reader 40 is located at the first stop location of the drive-through lane. However, the reader 40 may be located at any other location in the drive-through lane at which the customer's vehicle is expected to stop. In an alternate embodiment, a second reader 50 is included at the second location. The second reader 50 is capable of reading information from identification tags that are present within area 52, and may be used to verify the customer's identity at, the second location before the cashless transaction is completed.

In a preferred embodiment, the readers 40 and 50 are RFID interrogators, each 10 including a transmitter-receiver unit which is used to query an RFID transponder, such as tag 58. The operation of RFID interrogators and transponders are well-known in the art. Generally, an RFID transponder includes a semiconductor memory in which information may be stored. In operation, an RFID interrogator transmits an RF signal within a particular transmission area, and an RFID transponder within the signal area detects the interrogating signal and transmits a response signal, including data encoded in the semiconductor memory, back to the RFID interrogator. RFID transponders may have a memory capacity of several kilobytes or more, and in certain embodiments the memory of an RFID transponder may be written to by the RFID interrogator. The RFID transponder memory of the preferred embodiment may be used for many purposes, but should at least include a memory section for storing a unique customer ID. Other sections of memory could be used, for example, to track the number of times that a particular customer has frequented a particular establishment, for security features to help deter unauthorized duplication of the card, and for enabling and disabling the tag.

Tag 58 may be any type of RFID tag that is capable of being interrogated by readers 40 and 50. Preferably, the tag 58 is a 915 MHz passive tag on flex adhesive substrate allowing the tag 58 to be attached to a vehicle window glass. These adhesive tags may include theft-resistant features that disable the tag if removed from the vehicle, such as the adhesive tags described in U.S. patent application Ser. No. 09/321,506, filed on May 27, 1999, which is hereby incorporated by reference. Although it is preferred that the tag 58 be attached to the vehicle, other types of transponders may also be utilized, such as a 2.5 GHz passive tag on a rigid substrate.

In operation, a consumer may use the automatic payment system 10 by opening an account with a clearinghouse service which provides an RFID tag for a vehicle that the customer will drive. The clearinghouse service assigns a unique customer identification number to the consumer and associates the customer ID with a unique tag identification number stored in the memory of the RFID tag. The customer ID may also be associated with other RFID tags, allowing the consumer to use the automatic payment system 10 with multiple vehicles. In a preferred embodiment, an initial cash deposit is paid by the consumer to the clearinghouse, and the consumer grants the clearinghouse permission to directly charge a credit card or debit the consumer's bank account to replenish the prepaid balance when the balance falls below a specified level. Alternatively, the consumer may have established a credit arrangement with the clearinghouse so that that consumer's credit card or bank account may be charged automatically, or the customer may be billed periodically by the clearinghouse service.

Figure 2:
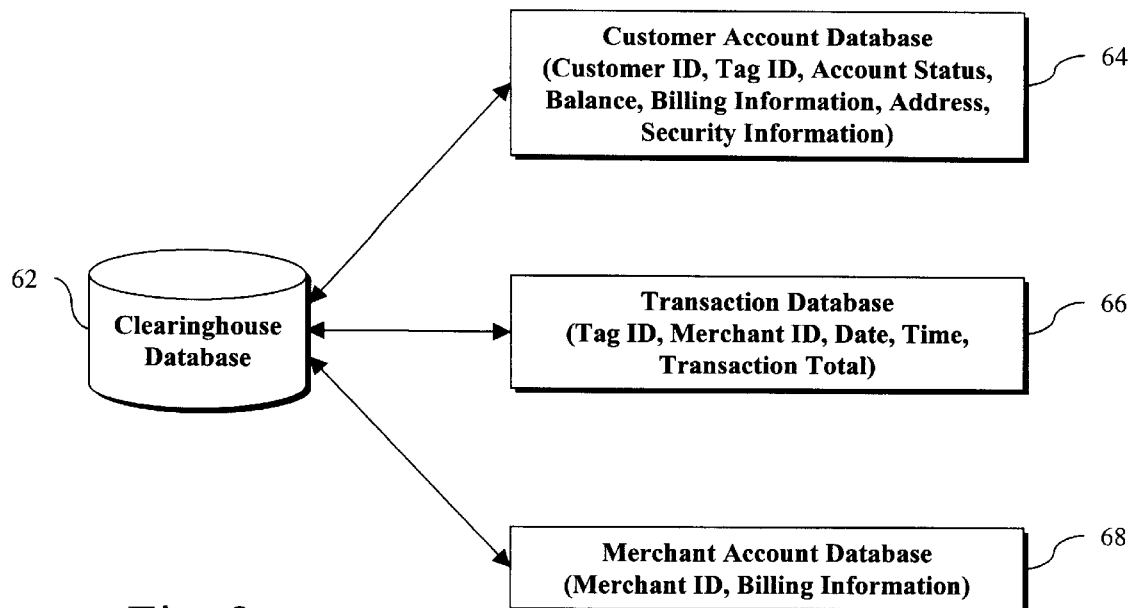
FIG. 2 illustrates a clearinghouse database of a preferred embodiment of the present invention.

The clearinghouse system 60 of the preferred embodiment is a general purpose computer adapted for communications over a network, such as the Internet 22, allowing the clearinghouse system 60 to communicate with a plurality of local merchant computers, such as local merchant computers 30, 70a and 70b. The clearinghouse, system 60 may also be adapted for communications with one or more banks 69a, credit card providers 69b, or other entities. The clearinghouse system 60 also includes a clearinghouse database 62 as illustrated in FIG. 2, which includes a customer account database 64, a transaction database 66 and a merchant account database 68. The customer account database 64 stores customer account information for a plurality of customers and includes the unique customer ID of each customer, associated tag IDs, and billing information for the customer's account, such as a current pre-paid balance and/or credit card account information. Other information may also be stored in the customer account database 64 such as account status, the customer's address, and security information.

Figure 3:
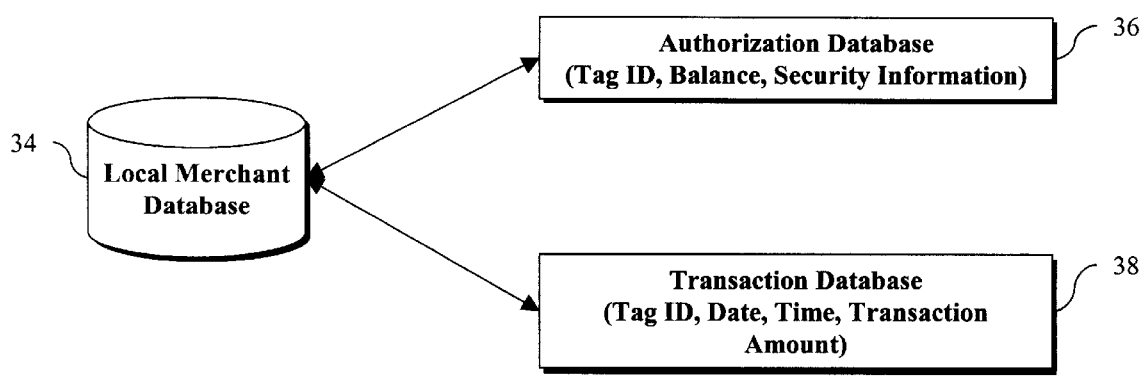
FIG. 3 illustrates a local merchant database of a preferred embodiment of the present invention.

In accordance with the preferred embodiment, the initial processing of a cashless transaction is performed by the local merchant. The local merchant computer 30 includes a local merchant database 34 as illustrated in FIG. 3, which includes an authorization database 36 and a transaction database 38. The authorization database 36 stores a list of active customer IDs and associated tag IDs that have been authorized for use as part of the automated payment system 10. The local computer 30 includes program logic for periodically downloading updated customer account information from the customer account database 64 of the clearinghouse system 60 so that the local computer 30 will maintain up-to-date customer account information. The information downloaded may include customer IDs, current account balance or credit limit and security information.

Figure 4:
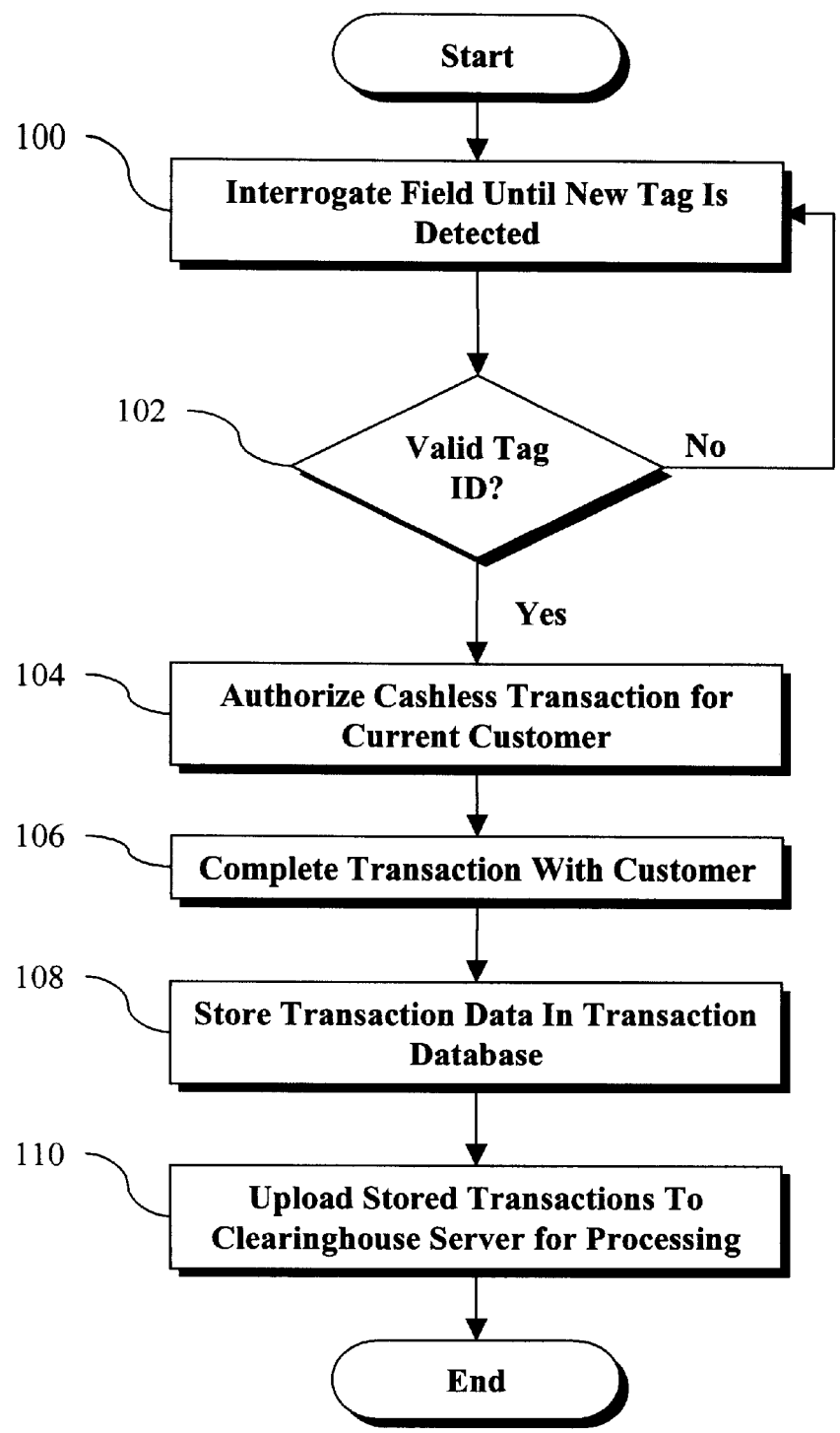
FIG. 4 is a flow diagram illustrating a preferred operation of the local merchant computer, reader and point of sale system in processing a cashless transaction.

The flow diagram of FIG. 4 illustrates the logic for operating a preferred embodiment of the local merchant system. The logic for controlling the processing a cashless transaction at the local merchant may be executed on any combination of the local computer 30, the point-of-sale system 32, the reader 40, and other systems used by the local merchant. At step 100, the reader 40 interrogates field 42 until it detects an RFID tag. When a new tag is detected (e.g., when vehicle 56 with tag 58 has stopped in field 42), the tag 58 responds with a unique tag ID number, which is retrieved by the reader 40. The reader 40 then delays to confirm the consumer's intent to make a purchase. In the preferred embodiment, the delay includes checking for the presence of other tags in the read area 42 and verifying that the tag 58 remains in the read area for a certain length of time to ensure that the vehicle 56 has stopped in the read area 42.

At step 102, the reader 40 forwards the tag ID number retrieved from tag 58 to the local computer 30 where it is compared against the list of active tag ID numbers stored in the authorization database 36 of the local computer 30. If the retrieved tag ID number is found in the authorization database 36, then at step 104, the authorization database 36 transmits a message to the point-of-sale system 32 to authorize the processing of a cashless transaction. In the preferred embodiment, the salesperson is notified through a display on the point-of-sale system 32 that the customer is a member of the clearinghouse service so that the salesperson may offer the customer the option of paying through the clearinghouse service. In an alternated embodiment, the local merchant database 34 is used to track the purchasing habits of the local merchant's regular customers. This information is accessed at step 102, allowing the local merchant to offer special discounts or promotions to its loyal customers.

If the tag ID number is not found in the authorization database 36, then the order may be completed as a cash transaction. In an alternate embodiment, when the tag ID number is not found in the authorization database 36, the local computer 30 sends a query to the clearinghouse computer 60 for the status of the customer account associated with the missing tag ID number. The clearinghouse computer 60 responds to the local merchant computer 30 with the status of the account, including the associated account information if the account is active. In a second alternate embodiment, when the tag ID number is not found in the authorization database 36, the reader 40 overwrites information stored in the memory of tag 58 to disable the tag 58.

After receiving the customer's order through speaker 44 and entering the order into the point-of-sale system 32, the salesperson completes the transaction at step 106. The customer is provided with the order and a receipt documenting the cashless transaction. In the preferred embodiment, the customer provides verbal authorization before a cashless transaction is completed. If additional security is desired, customer authorization may be provided by entering a personal identification number (PIN) on a numeric keypad (not shown) connected to the network 20. A PIN associated with each customer ID can be stored in the authorization database 36. In an alternate embodiment, the authorization database 36 includes an account balance or transaction limit for each customer ID, and the cashless transaction is only completed if the customer's account has sufficient funds.

The point-of-sales system 32 records the cashless order as a credit purchase and transaction information is stored in the transaction database 38 at step 108. In the preferred embodiment, the transaction information includes the time and date of the transaction, the items ordered, the price of each item ordered, any applicable sales tax, the transaction amount and the retrieved tag ID number. Information from the transaction database 38, including the tag ID number, the date, and the transaction amount are subsequently uploaded to the clearinghouse system 60 through the Internet 22 at step 110. The uploading may be performed any time after the cashless transaction is stored in the transaction database 38, and is preferably performed during periods of slow usage of the local merchant computer 30.

The clearinghouse computer 60 stores the uploaded transaction data in the transaction database 66 of the clearinghouse system 60. The information in the transaction database 66 is used to bill the accounts associated with the tag ID number of each transaction. The customer can be billed by deducting the transaction total from the customers prepaid balance, sending a bill directly to the customer, automatic withdrawal of the transaction total from the customer's bank 62a or credit card provider 62b, or through another payment method authorized by the customer.

Each entry of the transaction database 66 also includes a merchant ID to identify the local merchant associated with the transaction. Merchant account information is stored in merchant account database 68, and includes billing information for settling the transaction. In a preferred embodiment, the clearinghouse system 60 automatically credits the transaction total to the merchant's bank account, minus a processing fee for the clearinghouse service.

It should be appreciated that various modifications, adaptations, and alternative embodiments of the preferred embodiment described above may be made within the scope and spirit of the present invention For example, the clearinghouse system 60 may include a dedicated portion for receiving and logging transactions in real time. In step 106, after the customer authorizes the cashless transaction, the local computer 30 may immediately transmit the transaction data to the clearinghouse system 60. The clearinghouse system 60 then enters the data in the transaction database 68 and returns a message verifying the completed transaction. If the customer's account is inactive or has insufficient funds, the clearinghouse system 60 returns a message indicating that the cashless transaction cannot be completed. The clearinghouse system 60 may then process the order through the customer and merchant accounts at a later time.

Although a drive-through lane was described above, it should be appreciated that the automatic payment system of the present invention can also be used in virtually any environment in which a consumer is expected to arrive in a vehicle. For example, the automated payment system could also be used for automatic billing in environments such as toll-roads and parking garages where a vehicle must pass an entry point, self-serve environments such as gas stations, or for environments such as dry cleaners, where convenient short-term parking stalls are reserved for potential customers.

Figure 5:
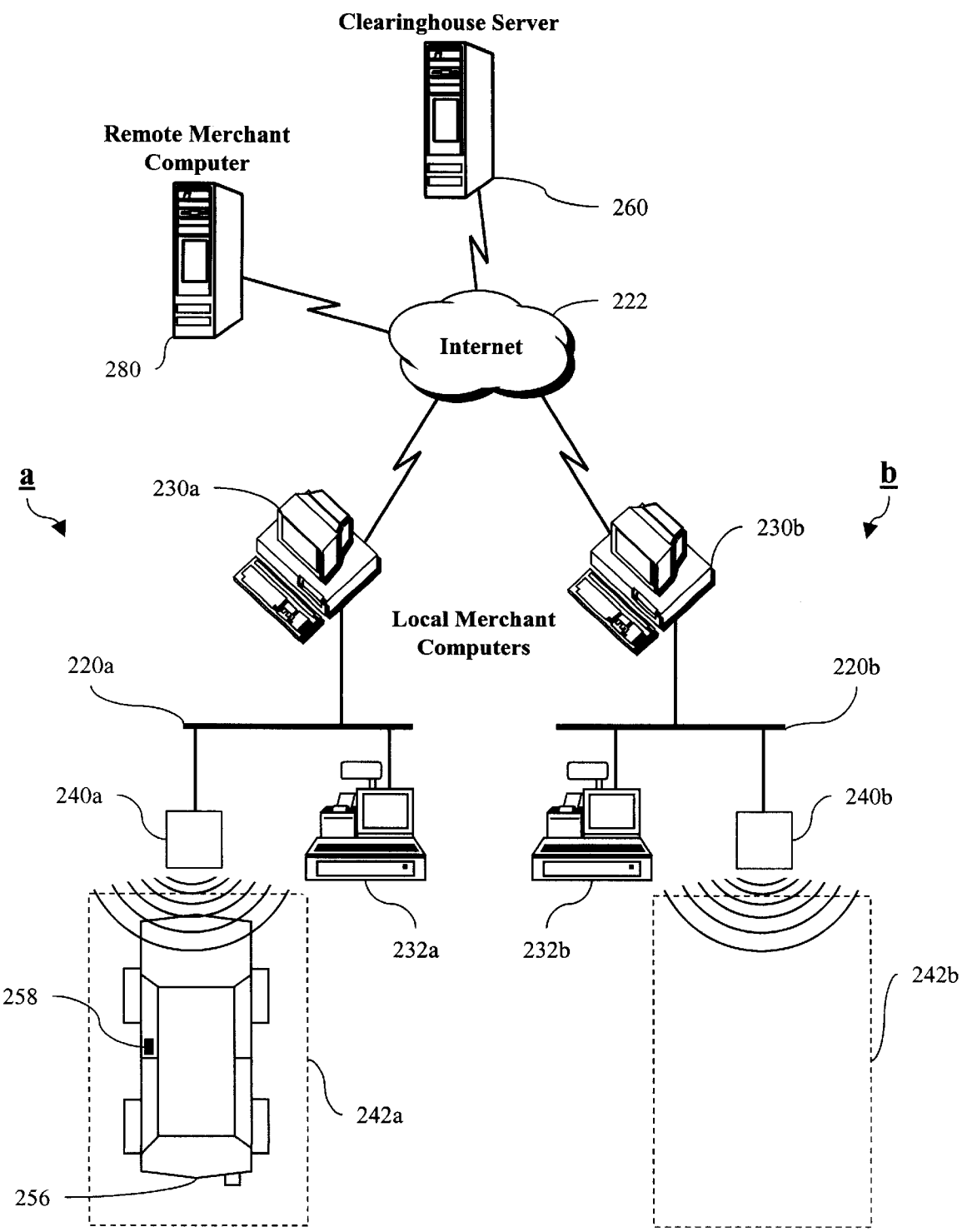
FIG. 5 illustrates an alternate embodiment of an automated payment system for a plurality of remote merchants.

An alternate embodiment of the automatic payment system is illustrated in FIG. 5. A merchant, such as a dry cleaner, has two remote locations (a and b) with each location including a local merchant computer 230 which is connected to a point-of-sales system 232 and a reader 240 through a network 222. Each reader 240 is located adjacent to a short-term parking stall and is adapted to interrogate tags, such as tag 258 attached to vehicle 256, that are located within an associated reading area 242. Each local merchant computer 230 includes communications capabilities allowing the local computer 230 to communicate with a remote computer such clearinghouse computer 260 and remote merchant computer 280, preferably through a network 222, such as the Internet. The remote merchant computer 280 provides centralized management of the local merchants, including accounting and inventory controls.

When a customer arrives and parks in a short-term parking stall, the reader 240a adjacent to the stall detects the unique customer ID from the tag 258. If the unique customer ID is found in the associated local merchant computer 230a, then the point-of-sale system 232a will be instructed to locate stored customer information. For example, a dry cleaner may program the point-of-sale system 232a to locate the customer's clothing and/or open an order entry screen with the customer's information for a new order, allowing a salesclerk to begin retrieving the customer's clothing and preparing for a new dry cleaning order before the customer enters the establishment. The stored customer information may be centrally stored in the remote merchant computer 280. The reader 240a continually interrogates the tag 258 to confirm that the tag 258 remains in the read field 242a during the entire transaction. The cashless transaction is stored locally in the local merchant computer 230 and periodically one or more transactions are uploaded to the clearinghouse computer 260 for processing.

Having thus described preferred embodiments of an Automatic Payment System for a Plurality of Remote Merchants, it should be apparent to those skilled in the art that certain advantages of the herein described system have been achieved. It should also be appreciated that various modifications, adaptations, and alternative embodiments thereof may be made within the scope and spirit of the present invention. The scope of the present invention is defined by the following claims.

What is claimed is:

1. A method for processing a cashless transaction comprising the steps of:

at a local merchant location, detecting the arrival and identity of a customer vehicle at the local merchant;

authorizing a cashless transaction based on the detected identity; and completing the authorized cashless transaction, the completed authorized cashless transaction having a transaction total;

wherein the steps of detecting, authorizing and completing are performed in real-time and without communication outside the local merchant location; and wherein, at a time subsequent to the completion of the authorized transaction, data representing the completed authorized transaction is transmitted to a remote location; and at the remote location, withdrawing funds equal to the transaction total from a customer account associated with the detected identity; and remitting the transaction total to a merchant account associated with the local merchant.

2. The method of claim 1 wherein the step of detecting comprises the step of reading a tag identification number from a tag disposed in the customer vehicle.

3. The method of claim 2 wherein the step of authorizing comprises the steps of searching for the tag identification number in a database of authorized tag identification numbers, and authorizing a cashless transaction if the tag identification number is found.

4. The method of claim 2 wherein the step of completing comprises the step of storing the data representing the completed authorized transaction in a local database.

5. The method of claim 3 further comprising the step of periodically updating the database of authorized tag identification numbers by downloading updates from a clearinghouse system.

6. The method of claim 3 wherein the step of authorizing further includes the step of, if the tag identification number is not found in the database of authorized tag identification numbers, operating a tag reader to disable the tag.

7. In a local merchant location including a merchant establishment and a short-term parking stall adjacent to the merchant establishment, a method for transacting with a customer comprising the steps of:

detecting the arrival of a vehicle in the short-term parking stall;

identifying a customer associated with the vehicle;

retrieving customer information associated with the identified customer;

starting a customer transaction for the customer based on the retrieved customer information before the customer enters the merchant establishment; and completing the customer transaction.

8. The method of claim 7 further comprising the step of authorizing a cashless transaction based on the retrieved customer information, wherein the completed customer transaction is a cashless transaction.

9. The method of claim 7 wherein the step of starting a customer transaction comprises the step of opening an order entry screen in a point-of-sale system, the order entry screen including a subset of the retrieved customer information.

10. The method of claim 7 wherein the step of starting a customer transaction comprises the steps of detecting a pending customer order and retrieving the pending customer order.

11. The method of claim 7 wherein the step of detecting comprises the step of operating a tag reader to read a tag identification number from a tag associated with the vehicle.

12. The method of claim 7 wherein the cashless customer transaction is completed at the local merchant, without communication outside the local merchant location.

13. The method of claim 8 wherein the step of detecting comprises the step of operating a tag reader to read a tag identification number from a tag associated with the vehicle and wherein the step of authorizing comprises the steps of searching for the tag identification number in a database of authorized tag identification numbers, and authorizing the cashless transaction if the tag identification number is found.

14. The method of claim 13 further comprising the step of periodically updating the database of authorized tag identification numbers by downloading updates from a clearinghouse system.

15. The method of claim 13 wherein the step of authorizing further includes the step of, if the tag identification number is not found in the database of authorized tag identification numbers, operating the tag reader to disable the tag.

* * * * *